Jan. 11, 1966 A. SEARS 3,229,133
DIRECT CURRENT HOMOPOLAR GENERATORS
Filed March 8, 1963 2 Sheets-Sheet 1
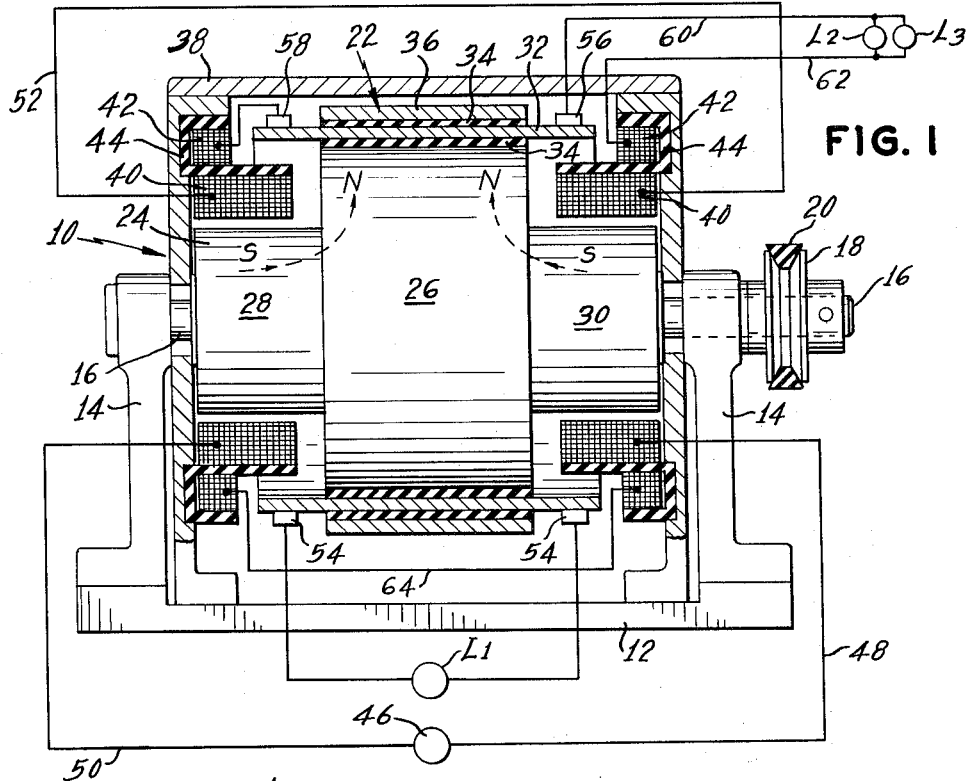
FIG. 1
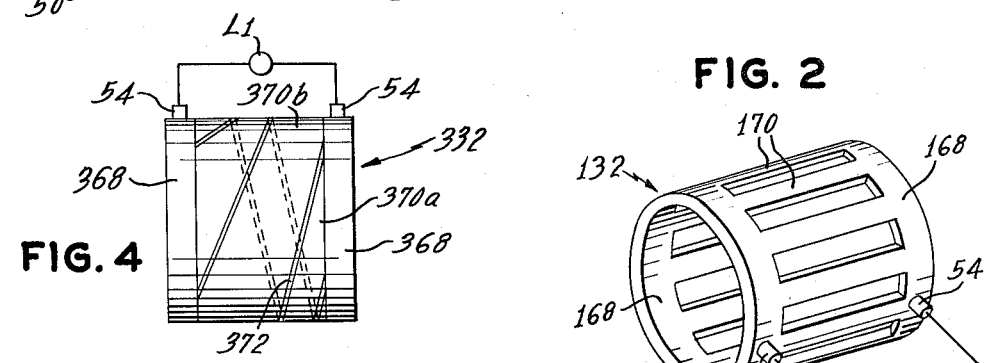
FIG. 2
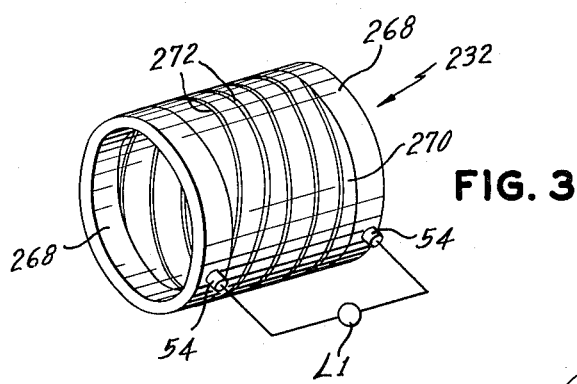
FIG. 3
FIG. 4
INVENTOR.
ANTHONY SEARS
BY
ATTORNEY

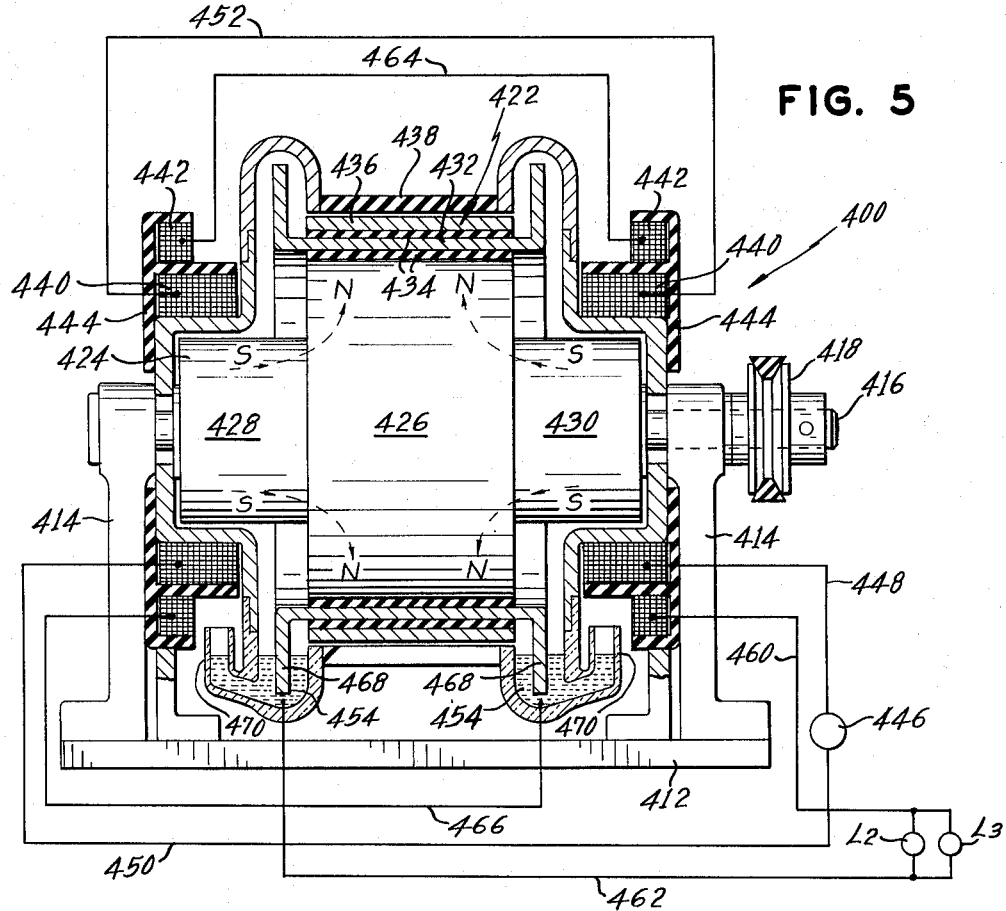

United States Patent Office 3,229,133
Patented Jan. 11, 1966

3,229,133
DIRECT CURRENT HOMOPOLAR GENERATORS
Anthony Sears, 88—00 Shore Front Parkway,
New York, N.Y.
Filed Mar. 8, 1963, Ser. No. 263,903
6 Claims. (Cl. 310—178)

This invention relates to homopolar generators and more particularly to direct current generators that are operated in the manner disclosed in co-pending United States patent application Ser. No. 21,759, filed Apr. 12, 1960, now Patent No. 3,096,454, and United States patent application Serial No. 251,398, filed Jan. 14, 1963, now Patent No. 3,185,877.

An object of the present invention is to provide a simple compact yet efficient homopolar generator that requires few moving parts, thereby materially eliminating the possibility of wear and breakdown, and a generator in which all of the current producing elements rotate together eliminating back drag or deleterious back electromotive forces that are normally present and produced in generators known heretofore.

Another object of the invention is to provide a generator which enables current to be induced in an inductor that rotates in a stationary magnetic field and from which current may be withdrawn.

Still another object of the invention is to provide a generator that is capable of having a wound inductor, thereby enabling the generator to produce variations in voltage and current.

Other and further objects of this invention reside in the structures and arrangements hereinafter more fully described with reference to the accompanying drawing in which:

FIG. 1 is a front elevation of a direct current homopolar generator constructed according to the teaching of the invention and showing the parts thereof in cross section, FIG. 2 is a reduced scale isometric view of a squirrel cage type inductor, FIG. 3 is a reduced scale isometric view of a single start type inductor, FIG. 4 is a reduced scale isometric view of a double start type inductor, FIG. 5 is a front elevation of a modified direct current homopolar generator showing parts thereof in cross-section, and FIG. 6 is a reduced scale isometric view of the inductor of FIG. 5.

Referring now to the drawings and more particularly to FIG. 1, the homopolar direct current generator there shown is generally identified by the numeral 10. The generator 10 comprises a stand 12 having upright supports 14 at its opposite ends in which there is bearingly mounted a rotor shaft 16. One end of the rotor shaft 16 extends beyond its respective one of the bearing supports 14 and has affixed to it a driving pulley 18 adapted to be rotated from any convenient source (not shown) by a belt or other drive transmitting means 20.

The rotor structure adapted to be rotated by the driven shaft 16 is generally identified by the numeral 22 and includes, in addition to the shaft 16, a rotor member of magnetizable material 24. As the description proceeds, those skilled in the art will recognize that the rotor member 24 may be a permanent magnet or may be constructed of magnetizable material in which a magnetic field may be produced.

The rotor member 24 is provided with an enlarged body portion 26 positioned intermediate the ends thereof and formed integral with narrower diameter body portions 28 and 30 at each of its ends. The rotor structure 22 includes an electrically conductive inductor element 32 positioned radially outward of the periphery of the enlarged body portion 26 and insulated therefrom at 34. Also included in the rotor structure 22 is a cylindrical or ring-shaped magnetizable member 36 referred to hereinafter as a jump ring.

Mounted on the stand 12 is a non-magnetic generator housing 38 that supports a pair of shunt coils 40, each one of which is positioned about a respective one of the narrowed body portions 28 and 30. The housing 38 also supports a pair of series coils 42 each one of which is positioned about a respective one of the shunt coils 40 and insulated therefrom at 44. The shunt coils 40 each are serially connected together and to an exciter 46 by the conductors 48, 50 and 52.

In the present embodiment of FIG. 1, the electrically conductive inductor element 32 is a solid cylindrically shaped member that extends fully about the outer periphery of the enlarged body portion 26 of the rotor member 24 and although insulated therefrom at 34 and from the jump ring 36, by the additional insulator 34, rotates with the rotor member 24 as an integral and unitary part thereof as does the jump ring 36. In normal operation, when the shaft 16 is caused to rotate by virtue of the movement of the belt 20 and the rotation of the pulley 18, the whole rotor structure 22 is also rotated carrying wtih it the rotor member 24 that includes the inductor element 32 and jump ring 36.

If the rotor member 24 is a permanent magnet such that the magnetic field is unidirectional, moving from the narrowed body portions 28 and 30 in the direction of the arrows inward toward the enlarged body portion 26 and then radially outward, the path of the magnetic field and flux will be directed through the encircling inductor element 32 in order to reach the jump ring 36. If the rotor member 24 is not a permanent magnet as described, the excitation of the shunt coils 40 will produce a magnetic field in the narrowed body portions 28 and 30. The magnetic field is unidirectional, and moves inward toward the enlarged body portion 26 and then radially outward to pass through the encircling inductor element 32 in order to reach the jump ring 36. The unidirectional flux path extending from the rotor member 24 to the jump ring 36 and passing through the inductor 32 induces an electromotive force therein.

A circuit is then completed across the inductor element in order to withdraw current therefrom. To enable this to be accomplished without elaborate mechanisms the inductor element 32 is made to extend longitudinally or lengthwise beyond the opposite ends of the enlarged body portion 26 of the rotor member 24 as shown in FIG. 1. A secondary current withdrawing circuit includes a pair of brush elements 54 connected directly in a series circuit with a load L1. The main current may be withdrawn from the inductor element 32 by a circuit comprising brushes 56 and 58. The brush 56 is connected in series with loads L2 and L3 by way of a conductor 60 while the opposite sides of these loads may be connected in series with the series coils 42 by way of conductors 62 and 64. When the series coils 42 are connected as shown, they compound and add to the voltage of the shunt coils 40 to maintain a steady voltage and, therefore, generate or produce and maintain a steady magnetic flux path in the rotor member 24.

In the embodiment of FIG. 1, the inductor element 32 is an annular, imperforate cylindrical member whose end portions are longitudinally spaced from each other on opposite sides of the magnetic field extending therethrough. Because the inductor 32 is cylindrically shaped throughout its length, its end portions are similarly cylindrical in shape and provide smooth uninterrupted surfaces which the brushes 54, 56 and 58 engage. The engaged end contact portions of the inductor 32, therefore, are substantially the same radial distance from the axis of rotation of the rotor structure 22.

Referring now to the embodiment in FIG. 2, the inductor element there shown is generally identified by the numeral 132, the last two digits of this numeral corresponding to the numeral 32 employed to identify the inductor element of FIG. 1. The inductor element 132 of the embodiment of FIG. 2 is in the shape of a squirrel cage and it includes longitudinally spaced cylindrically shaped contact portions 168 each of which is connected with the other in a lengthwised spaced relationship by electrically conductive strips 170. The strips 170 are positioned longitudinally along the length of the outer periphery of the enlarged body portion 26 of the rotor member 24 and spaced circumferentially thereabout, but parallel to the axis of rotation of the rotor member. It will be noted in the embodiment of FIG. 2 that the current supplied to the load L1 may be withdrawn from the inductor element 132 by the brushes 54 which engage the circularly shaped contact portions 168. These contact portions 168, as illustrated in the prior embodiment of the inductor element 32, will be positioned on opposite sides of the magnetic field passing through the inductor element. However, in the present embodiment of the inductor element 132, the squirrel cage eliminates the necessity of including a jump ring 36 as shown and described in the embodiment of FIG. 1. In practice, although the jump ring 36 has been utilized with the inductor element 132, it was found to be unnecessary.

The inductor shown in FIG. 3 is generally identified by the numeral 232 and is referred to as a single start inductor. The inductor 232 comprises two contact portions 268 each of which is spaced longitudinally or lengthwise with respect to the other. The contact portions 268 are cylindrically shaped and, therefore, their outer surfaces are substantially equal radial distances from the axis of the rotor structure 22 when the same is employed therein in place of the inductor 32 shown in FIG. 1 and previously described.

The inductor structure 232 of FIG. 3 is referred to as a single start because it includes a single electrically conductive element 270 that is spirally wound for intimate electrical contacting and conducting engagement with one of the contact portions 268 at one of is ends and with the other of the contact porions 268 at its opposite end. A single electrically conductive element 270 is shaped in the form of a spiral and is wound in circular form to encompass the periphery of the enlarged body portion 26 of the rotor member 24 when positioned thereabout and insulated therefrom by the insulator 34 (see FIG. 1). The turns of the single inductor 270 are insulated from each other by any convenient non-conductive insulator 272. The winding of the inductor element 270 provides a longer electron path through which electrons may move when the electromotive force is induced therein.

The conductive member 270 may have a single turn or a plurality of turns, as shown, between the connection with its end contact portions 268. The more turns the conductor member 270 has, the higher will be its voltage output and the lower will be its current output. Hence, by comparison, the spirally wound conductive member 270 is capable of producing a relatively higher voltage and lower current than the single inductor 32 shown in FIG. 1. Those skilled in the art will recognize that the spiral turns of the inductor member 270 will traverse the lengthwise extent of the enlarged body portion 26 of the rotor member 24 when positioned thereabout and utilized in place of the embodiment of the inductor structure 32 shown in FIG. 1.

Referring now to the embodiment shown in FIG. 4, the inductor structure is generally identified by the numeral 332 and is conveniently referred to as a double start inductor. Included in the inductor structor 332 are two end contact portions 368 each of which is cylindrically shaped and constantly engaged by the brushes 54. As in the inductors 32, 132 and 232, the outer surfaces of such contact portions are substantially equal radial distances from the axis of rotation of the rotor structure 22 when the same is utilized therein in place of the inductor structure 32 there shown in FIG. 1. The contact portions 368 are spaced lengthwise or longitudinally with respect to each other and electrically connected in such spaced relationship by a plurality of electrically conductive elements 370a and 370b, each of which is connected at one of their ends to one of the contact portions 368 and at the other of their ends to the other spaced contact portion 368. The electrically conductive elements 370a and 370b traverse the lengthwise extent of the enlarged body portion 26 of the rotor member 24 when positioned thereabout, thereby insuring, as in the embodiment 232 of FIG. 3, that the path of the magnetic field produced in the rotor member 24 extends therethrough.

Each turn of each of the electrically conductive elements 370a and 370b is insulated from the other at 372. When either the double start inductor 332 or the single start inductor 232 is employed in the generator 10 shown in FIG. 1 in place of the inductor 32 there shown, the jump ring 36 is utilized. It has been found in practice that the use of the jump ring 36 appears to encourage the movement of the flux path through the traversing windings of the electrically conductive elements thereby insuring that the flux path will pass through the respective inductors. The inductor structure 332 of FIG. 4 enables the withdrawal of a relatively lower voltage and greater current than that capable of being withdrawn from the inductor structure 232 of the embodiment shown in FIG. 3.

Referring to FIGS. 5 and 6, the modified embodiment of the homopolar direct current generator there shown is generally identified by the numeral 400. The generator 400 is similar in structure and operation to that of the generator 10 previously described. In order to portray the similarity of details between the generators 10 and 400, numerals in the 400 series will be employed in the present embodiment with the tens digits thereof corresponding to like numbered parts in the description of the generator 10.

The generator 400 comprises a stand 412 having supports 414 at its opposite ends and in which the shaft 416 is mounted for rotation. A driving pulley 418 is fixed to the shaft to rotate the same by any convenient driving means. The rotor structure 422 is similar in detail to the rotor structure 22 and differs therefrom solely in the structural arrangement of the electrically conductive inductor element 432 shown in greater detail in FIG. 6 and in the brush contacts engaged therewith. The element 432 is substantially spool-shaped and includes radially directed contact portions 468 at its opposite ends. As in the prior embodiment, the element 432 is separated and insulated from the jump ring 436 by insulators 434.

Non-rotatably mounted on the support 414 is a non-conductive, non-magnetic housing 438 supporting an insulator 444 that serves to mount the pairs of shunt coils 440 and series coils 442. The shunt coils 440 are connected in series with an exciter 446 by conductors 448, 450 and 452. A plurality of loads L2 and L3 are connected with one of the series coils 442 by a conductor 460 while the circuit to the loads is completed with a brush contact 454 in the housing 438 by a conductor 462. The series connection between the coils 442 is completed at 464. The series connection between the coils 442 and the loads L2 and L3 is completed by a conductor 466 that connects the other of the series coils 442 with a brush contact 454 in the housing 438.

The arrangement of the housing 438 and the brush contacts 468 of the element 432 is such as to enable the use of a flowing type, non-solid electrolytic brush elements 454 that are in constant electrical engagement with the continuous contacts 468 of the inductor 432. In order to retain the fluent type brush elements 454 about and in electrical engagement with the contacts 468, the housing 438 encompasses and encloses the rotor 422. The housing 438 is provided with a plurality of standpipes 470 each in the area of the respective contacts 468. The standpipes 470 may be in the form of transparent sight glass tubes through which an electrically conductive fluid or non-solid electrolytic material may be poured to flow into the housing and about the contacts 468 for constant electrical contact and engagement therewith.

The operation of the embodiment 400 is substantially the same as that of the previously described embodiment 10 except that the fluent or non-solid brushes 454 will flow and constantly remain in electrical transmitting engagement with the contacts 468 without experiencing the same degree of wear as the brushes 54, 56 and 58 of the prior embodiment 10. Any loss of brush contact material 454 through evaporation or disintegration can always be seen through the visible sight glass 470 and may be supplemented from time to time by the addition of material therethrough.

Those skilled in the art will recognize that because the operation of the embodiments 10 and 400 are substantially the same, it is within the contemplation of the invention to employ the inductor elements 132, 232 and 332 in the embodiment 400. When placed in such use, however, it will be necessary merely to vary the arrangement of the contact brushes 168, 268 and 368 respectively thereof to position the same radially such as is demonstrated with respect to the contact portions 468 of the inductor 432, thereby insuring the constant electrical engagement with the electrolyte 454.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. A direct current homopolar generator comprising a rotor, said rotor having means to produce a unidirectional magnetic field moving in one direction along said rotor, means to rotate said rotor, a cylindrical inductor rotatable with said rotor in the path of the magnetic field, means completing an electrical circuit across said inductor at different lengthwise spaced portions thereof, and means rotatable with said rotor to collect the magnetic flux of the magnetic field.

2. A direct current homopolar generator comprising a rotor and an inductor rotatable unitarily, means associated with said rotor to produce a unidirectional magnetic field therein and through said inductor, means rotatable with said rotor to collect the magnetic flux after the same moves through said inductor, said inductor having cylindrically shaped current conducting contact elements each spaced lengthwise from the other on opposite sides of said magnetic flux path directed through said inductor, and means completing an electrical circuit between said contact elements.

3. A direct current homopolar generator comprising a rotor, an inductor, said rotor having means to produce a unidirectional magnetic field directed through said inductor, said inductor and rotor being rotatable as a unit, means rotatable with said rotor to collect the flux of the magnetic field, and means completing an electrical circuit across longitudinally spaced portions of said inductor at substantially equal radial distances thereof.

4. A direct current homopolar generator comprising a rotor, means connected with said rotor to rotate the same, an electrically conductive element fixed to and for simultaneous rotation with said rotor, means operable to produce a unidirectional magnetic field in said rotor and through said electrically conductive element, means rotatable simultaneously with said rotor to collect the magnetic flux after the same moves through said conductive element, and a plurality of means completing an electrical circuit across substantially equal radially distanced portions on said electrically conductive element and spaced lengthwise from each other on opposite sides of said magnetic field directed through said electrically conductive element.

5. A direct current homopolar generator comprising a rotor including an inductor rotatable therewith, means rotatable with said rotor and inductor to produce a unidirectional magnetic field in said rotor and directed therefrom through said inductor, means rotatable with said rotor to collect the flux of the magnetic field, and electrically conductive fluent means in electrical contact with said inductor at a plurality of substantially equal radial distances thereof.

6. A generator as in claim 5, said inductor being substantially cylindrically shaped and having end contact brush portions thereof extending radially into engagement with said electrically conductive fluent means.

References Cited by the Examiner

UNITED STATES PATENTS

| | | | |
|---|---|---|---|
| 341,097 | 5/1886 | De Ferranti | 310—178 |
| 400,838 | 4/1889 | Entz | 310—178 |
| 1,791,978 | 2/1931 | Sessions | 310—178 |
| 2,539,569 | 1/1951 | Clark | 310—178 |
| 2,588,466 | 3/1952 | Barnes | 310—178 |
| 3,052,958 | 9/1962 | Anderson | 310—86 X |

OTHER REFERENCES

Pender: Direct Current Machinery, John Wiley and Sons, pp. 246 and 248, 1928.

MILTON O. HIRSHFIELD, *Primary Examiner.*

ORIS L. RADER, *Examiner.*

D. F. DUGGAN, *Assistant Examiner.*